Patented Feb. 8, 1949

2,461,502

UNITED STATES PATENT OFFICE 2,461,502

CYANOETHYL ETHERS OF GALACTO-MANNAN AND GLUCOMANNAN GUMS

Owen A. Moe, Minneapolis, Minn., assignor to General Mills, Inc., a corporation of Delaware No Drawing. Application April 25, 1946, Serial No. 664,986

8 Claims. (Cl. 260—209)

The present invention relates to cyanoethyl ethers of galactomannan and glucomannan type gums and to a method of making these ethers and hydrolyzing them to the carboxyethyl ethers.

The cyanoethyl ether derivatives described herein are novel products and possess certain unusual properties. They are insoluble in water and in the usual organic solvents. They may be readily hydrolyzed to the carboxyethyl ethers which are soluble in water and which display good viscosities in low concentration solutions. These solutions are capable of forming films of good clarity and strength. The cyanoethyl ethers are also useful as intermediates in the preparation of further derivatives of the gums.

It is therefore an object of the present invention to provide novel cyanoethyl ether derivatives of galactomannan and glucomannan type gums.

It is another object of the present invention to provide a process of producing these cyanoethyl ethers and of hydrolyzing them to the corresponding carboxyethyl ethers.

These and other objects of the invention will be more fully apparent from the following description with particular reference to the specific examples which are to be understood as illustrative only and not as limiting the invention.

The invention is applicable to the galactomannan and glucomannan gums. These gums are polysaccharides composed principally of galactose and mannose units, and glucose and mannose units, respectively. The galactomannans are usually found in the endosperm of leguminous seeds, such as guar, locust bean, honey locust, flame tree, *Cassia occidentalis*, and the like. The glucomannans, on the other hand, are usually found in the corms of plants of the Araceae family, such as *Amorphophallus oncophyllus*, from which the product known as iles mannan is obtained, and *Amorphophallus rivieri* from which konnyaku flour is obtained. The cyanoethyl ethers of these gums can be readily prepared by treating an alkaline solution of the gum with acrylonitrile or substituted acrylonitrile such as methacrylonitrile, all of which are contemplated as being included in the term "an acrylonitrile" as used herein and in the claims. The reaction proceeds readily in a short period of time and at ordinary temperatures. The cyanoethyl ether is insoluble in water and precipitates as soon as formed. It can be recovered from the reaction mixture by simple filtration.

The general procedure for forming these ethers is as follows: 20 parts of the gum are dispersed in 200 parts of water and 5–10 parts of 20% aqueous sodium hydroxide are added. After very thorough stirring 15–30 parts of acrylonitrile are added with vigorous stirring. After a short time interval, the cyanoethylation products begin to separate and they may be collected by filtration and purified in a simple manner. Temperatures are preferably near room temperature, although higher and lower temperatures may be used with varying degrees of success. In general, temperatures of 20–40° C. are found satisfactory, while temperatures within the range 23–26° C. are preferred.

Various alkaline materials may be used for the dispersion of the gum in aqueous solution. Such materials as sodium, potassium, and lithium hydroxides, or strong organic bases such as quoternary ammonium hydroxides, for example benzyl trimethyl ammonium hydroxide may be used. The concentration of the gum in the alkaline dispersion may be varied widely but it is preferred to use a dispersion of approximately 10%. The acrylonitrile may be used within the proportions of 2.5 to 5 moles per anhydro sugar unit, but in general, there appears to be little advantage in exceeding 3.4 moles of acrylonitrile per sugar unit.

The cyanoethyl ether derivatives herein described generally have a considerable degree of substitution. In general, the products prepared as described herein have a degree of substitution varying from approximately one up to about 1.8 ether groups per anhydro sugar unit.

These cyanoethyl ethers may be hydrolyzed to form the water soluble carboxyethyl gum ethers described in my copending application, Serial No. 612,717 filed August 25, 1945. The present invention provides a novel method of forming these carboxyethyl ethers, and, in general, it will be found that it is possible by this method to produce carboxyethyl ether derivatives having a substantial degree of substitution, although lower degrees of substitution can also be obtained. Apparently the structural configuration of the galactomannan and glucomannan type gums permits rather rigorous hydrolytic conditions without suffering undue degradation. The resultant 2-carboxyethyl gum ethers yield clear viscous 2% solutions which are capable of forming films possessing interesting properties. Films thus formed are of good clarity and strength and may, if necessary, be plasticized with such water soluble plasticizers as glycerin and other polyhydroxy compounds.

In addition to their film forming properties, the carboxyethyl ethers find many and varied uses in the art. They may be used as thickening agents in general. They also serve as useful sizing and finishing agents. They may also serve as protective colloids, and dispersions or emulsions are stabilized by their presence. The ability of these products to yield viscous 2% solutions displaying very good clarity and stability is of great interest in numerous pharmaceutical preparations.

Example 1

20 parts of finely powdered guar gum were dispersed in 200 parts of water and 10 parts of a 20% sodium hydroxide solution were added with vigorous stirring. After permitting the alkali gum mixture to stand for a short time interval, 30 parts of acrylonitrile were added with vigorous mixing. After the reaction mixture had become homogeneous, it was allowed to stand at room temperature without stirring. The cyanoethylation product had separated to a considerable extent after standing for 45 minutes. However, the reaction mixture was allowed to stand for another hour when the liquid layer was removed by decantation. The reaction product was washed repeatedly with alcohol and vigorously mixed with alcohol. Finally the product was collected by filtration and dried in vacuo. This collected cyanoethyl guar gum ether amounted to 29.4 parts after drying. The product contained 8.9% nitrogen. This percentage of nitrogen corresponds to approximately 1.55 cyanoethyl groups per anhydro sugar residue. The resulting cyanoethyl guar gum ether was insoluble in water and in the usual organic solvents.

Example 2

20 parts of guar gum (finely powdered) were dispersed in 200 parts of water and 5 parts of 20% sodium hydroxide solution were added with vigorous strring. 20 parts of acrylonitrile were then added and the resultant reaction mixture was stirred vigorously until homogeneous. After 90 minutes the cyanoethylation product began to separate and after an additional 75 minutes the separation was substantially complete. The reaction mixture was stirred vigorously and allowed to stand for two hours at room temperature when the reaction product was worked up in the manner previously described. The dried product, which was obtained in the amount of 25 parts, contained 8.4% nitrogen. This percentage of nitrogen indicates a degree of substitution of approximately 1.45. It was observed that practically the same percentage of nitrogen was found when the above reaction was carried out employing 30 parts of acrylonitrile and decreasing the length of reaction time. The products were insoluble in water and in the usual organic solvents.

Example 3

20 parts of finely ground guar gum were dispersed in 200 parts of water and 10 parts of 20% sodium hydroxide solution were added with vigorous strring. Fifteen parts of acrylonitrile were added and the resulting reaction mixture was stirred until homogeneous. After standing at room temperature for 2¼ hours a substantial separation was noted. The reaction mixture was subjected to vigorous mixing and after standing for an additional 2¼ hours it was worked up in the usual manner. The product thus obtained analyzed for 7.1% nitrogen which indicates a degree of substitution of 1.1.

Example 4

20 parts of finely powdered locust bean gum were dispersed in 200 parts of water followed by the addition of 7 parts of a 20% sodium hydroxide solution. 35 grams of acrylonitrile were added and the resulting reaction mixture was subjected to vigorous mixing until it was homogeneous. The resultant reaction mixture was allowed to stand at room temperature and after about 30 minutes the reaction product began to separate. The mixture was allowed to stand for 4 hours when the excess base was neutralized by the gradual addition of dilute acetic acid and an excess of methanol was added, and the reaction product was collected by filtration. The cyanoethylation product was washed with methanol and ether and dried in vacuo. This cyanoethyl ether of locust bean gum contained 9.1% nitrogen which corresponds to a degree of substitution of 1.6.

Example 5

Twenty parts of finely ground honey locust gum were dispersed in 200 parts of water and 10 parts of a 20% sodium hydroxide solution were added. Thirty parts of acrylonitrile were added with vigorous stirring. The cyanoethylation product started to separate after the reaction mixture had been allowed to stand for 55 minutes at room temperature. The separation of the cyanoethylation product was extremely rapid after the 55-minutes induction period and appeared to be substantially complete in less than 10 minutes. The resultant reaction mixture was subjected to vigorous mixing and the reaction product was worked up in the usual manner. After drying, the product amounted to 27 parts, and contained 9.9% nitrogen, which indicates a degree of substitution of 1.82.

Example 6

Ten parts of finely ground tara gum were dispersed in 100 parts of water and 5 parts of 20% sodium hydroxide solution were added with vigorous stirring. Fifteen parts of acrylonitrile were then added and vigorous stirring was continued until the reaction mixture was homogeneous. The separation of the cyanoethylation product started to take place after the reaction mixture had been allowed to stand at room temperature for a period of 50 minutes. After 75 minutes the precipitation of the cyanoethylation product was substantially complete. The upper liquid layer was removed by decantation and the lower layer containing the product was worked up in the known manner. This cyanoethyl tara gum ether contained 7.84% nitrogen which indicates a degree of substitution of 1.28.

Example 7

Ten parts of flame tree gum (finely powdered) were dispersed in 100 parts of water and 5 parts of sodium hydroxide solution were added. Fifteen parts of acrylonitrile were added and after vigorous stirring the reaction mixture was allowed to stand at room temperature. After 50 minutes the separation of the cyanoethylation product occurred, and it was substantially complete after 75 minutes. The upper liquid layer was removed by decantation and the reaction product was purified in the known manner. It contained 6.27% nitrogen which indicates a degree of substitution of 0.96.

Example 8

A cyanoethyl ether of locust bean gum which contains 9% nitrogen was hydrolyzed to the 2-carboxyethyl gum ether as outlined below:

Two parts of the above cyanoethylation product were mixed with 20 parts of 10% aqueous sodium hydroxide solution and the resulting mixture was heated in a hot water bath. The mixture soon thickened and the evolution of copious quantities of ammonia was noted. 75 parts of water were added gradually. Thereafter heating was continued yielding a clear viscous solution. Complete solubility was attained. The reaction product was precipitated by the gradual addition of methanol, washed with fresh methanol and ether, collected by filtration and dried in vacuo. The dried product was dissolved in water to yield a very viscous and clear 2% solution. A portion of this solution was cast on a glass plate and the resulting film was clear, fairly flexible and strong. The hydrolyzed product (2-carboxyethyl gum ether) contained 0.16% nitrogen indicating that the hydrolysis was substantially complete.

Example 9

Ten parts of iles mannan gum were dispersed in one hundred parts of water containing two parts of sodium hydroxide. The resulting reaction mixture was stirred until complete dispersion was obtained. Fifteen parts of acrylonitrile were added with very efficient mixing. After the reaction mixture had become homogeneous it was allowed to stand at room temperature. After approximately ninety minutes, the separation of the insoluble cyanoethyl ether was substantially complete. However, the reaction was allowed to proceed for an additional hour when the liquid layer was removed by decantation. The insoluble cyanoethyl ether of iles mannan gum was worked up in the usual manner.

Example 10

Ten parts of honey locust gum were mixed with 100 parts of water and 10 parts of 20% sodium hydroxide solution were added. Ten parts of acrylonitrile were added with vigorous stirring and the resulting reaction mixture was allowed to stand at room temperature. When the first sign of separation of the cyanoethylation product was noted, the reaction mixture was placed in a water bath and a substantial amount of separation had occurred when the temperature reached 40° C. The upper liquid layer was then removed by decantation and 50 parts of 10% alkali were added. The resulting reaction mixture was heated in a water bath for one hour when an additional portion (50 parts) of water was added and the heating was continued for an additional 30 minutes when 50 parts of water were added with stirring. The total heating time was 90 minutes. The reaction mixture was diluted with 150 parts of water with vigorous mixing. After neutralization the product was precipitated with methanol, collected and dried in vacuo. The 2-carboxyethyl ether of honey locust gum obtained in this manner yielded films which were clear, strong, and flexible.

The hydrolysis conditions in the various examples may be varied as is well understood in the art. Both time and temperature may be varied depending upon the degree of hydrolysis desired. Thus it is possible to stop the hydrolysis at any point between that at which most of the ether groups are still present as the cyanoethyl groups, and a point at which practically all the ether groups are in the form of carboxyethyl groups. The above examples show how the hydrolysis may be carried to the point of substantially complete hydrolysis such that the product is water soluble. By varying the degree of hydrolysis it is possible to obtain products of varying degrees of water solubility. Other variables in the hydrolysis reaction include the kind and concentration of alkali as well as the concentration of the cyanoethyl ether gum derivative.

While various modifications of the invention have been described it is to be understood that the same is not limited thereto but may be varied within the scope of the following claims.

I claim as my invention:

1. A cyanoethyl ether of a gum selected from the group consisting of galactomannan and glucomannan gums.
2. A cyanoethyl ether of guar gum.
3. A cyanoethyl ether of locust bean gum.
4. A cyanoethyl ether of a gum selected from the group consisting of galactomannan and glucomannan gums having a degree of substitution not substantially less than about one cyanoethyl ether group per anhydro sugar unit.
5. A process of making a cyanoethyl ether of a gum selected from the group consisting of galactomannan and glucomannan gums, which comprises condensing said gum with an acrylonitrile.
6. A process of making a cyanoethyl ether of a gum selected from the group consisting of galactomannan and glucomannan gums, which comprises condensing an alkaline dispersion of said gum with an acrylonitrile at about room temperature and within the approximate proportions of about 2.5–5 moles of acrylonitrile per anhydro sugar unit.
7. A process of making a cyanoethyl ether of a gum selected from the group consisting of galactomannan and glucomannan gums, which comprises condensing an alkaline dispersion of said gum with acrylonitrile at about room temperature and within the approximate proportions of not substantially in excess of 3.4 moles of acrylonitrile per anhydro sugar unit.
8. A process of making a cyanoethyl ether of a gum selected from the group consisting of galactomannan and glucomannan gums, which comprises condensing said gum with acrylonitrile.

OWEN A. MOE.

REFERENCES CITED

The following references are of record in the file of this patent:

UNITED STATES PATENTS

| Number | Name | Date |
| --- | --- | --- |
| 1,350,820 | Lilienfeld | Aug. 24, 1920 |
| 2,316,129 | Bock | Apr. 6, 1943 |